(12) United States Patent
Dür et al.

(10) Patent No.: US 8,147,292 B2
(45) Date of Patent: Apr. 3, 2012

(54) DEVICE FOR POLISHING HARD SURFACES, ESPECIALLY GLASS SURFACES

(75) Inventors: Bernhard Dür, Galgenen (CH); Beat Steinmann, Horgen (CH)

(73) Assignee: Vetrox AG, Pfaffikon (CH)

( * ) Notice: Subject to any disclaimer, the term of this patent is extended or adjusted under 35 U.S.C. 154(b) by 1043 days.

(21) Appl. No.: 11/792,328

(22) PCT Filed: Dec. 5, 2005

(86) PCT No.: PCT/EP2005/013011
§ 371 (c)(1),
(2), (4) Date: Jan. 30, 2008

(87) PCT Pub. No.: WO2006/061172
PCT Pub. Date: Jun. 15, 2006

(65) Prior Publication Data
US 2009/0017735 A1   Jan. 15, 2009

(30) Foreign Application Priority Data
Dec. 6, 2004 (CH) ...................................... 2013/04

(51) Int. Cl.
*B24B 49/00* (2006.01)
(52) U.S. Cl. ........................... 451/11; 451/127; 451/153
(58) Field of Classification Search ................. 451/11, 451/124, 127, 150, 153
See application file for complete search history.

(56) References Cited

U.S. PATENT DOCUMENTS

| | | | | |
|---|---|---|---|---|
| 1,734,065 A * | 11/1929 | Werotte | | 451/260 |
| 2,075,369 A * | 3/1937 | Stetler | | 451/354 |
| 5,276,999 A * | 1/1994 | Bando | | 451/303 |
| 5,409,417 A * | 4/1995 | Bando | | 451/9 |
| 5,472,367 A * | 12/1995 | Slocum et al. | | 451/5 |
| 5,873,773 A * | 2/1999 | Bando | | 451/70 |
| 5,888,268 A * | 3/1999 | Bando | | 65/286 |
| 2004/0072514 A1* | 4/2004 | Bando | | 451/175 |

FOREIGN PATENT DOCUMENTS

| | | |
|---|---|---|
| DE | 92 03 296 U1 | 5/1992 |
| DE | 100 53 410 C1 | 4/2002 |
| EP | 1252996 A | 10/2002 |

* cited by examiner

*Primary Examiner* — Maurina Rachuba
(74) *Attorney, Agent, or Firm* — Brian Roffe

(57) ABSTRACT

The invention relates to a device for polishing hard surfaces, especially glass surfaces, said device comprising polishing system (5) provided with a replaceable polishing disk (6). Said polishing system (5) can be displaced in a two-dimensional manner by means of a displacement device (10) comprising a holding element (11) for the polishing system (5), and guiding elements (12, 18; 20, 25) for displacing the holding element (11) in XY directions. The inventive device enables hard surfaces to be repaired in a simple and precise manner.

18 Claims, 6 Drawing Sheets

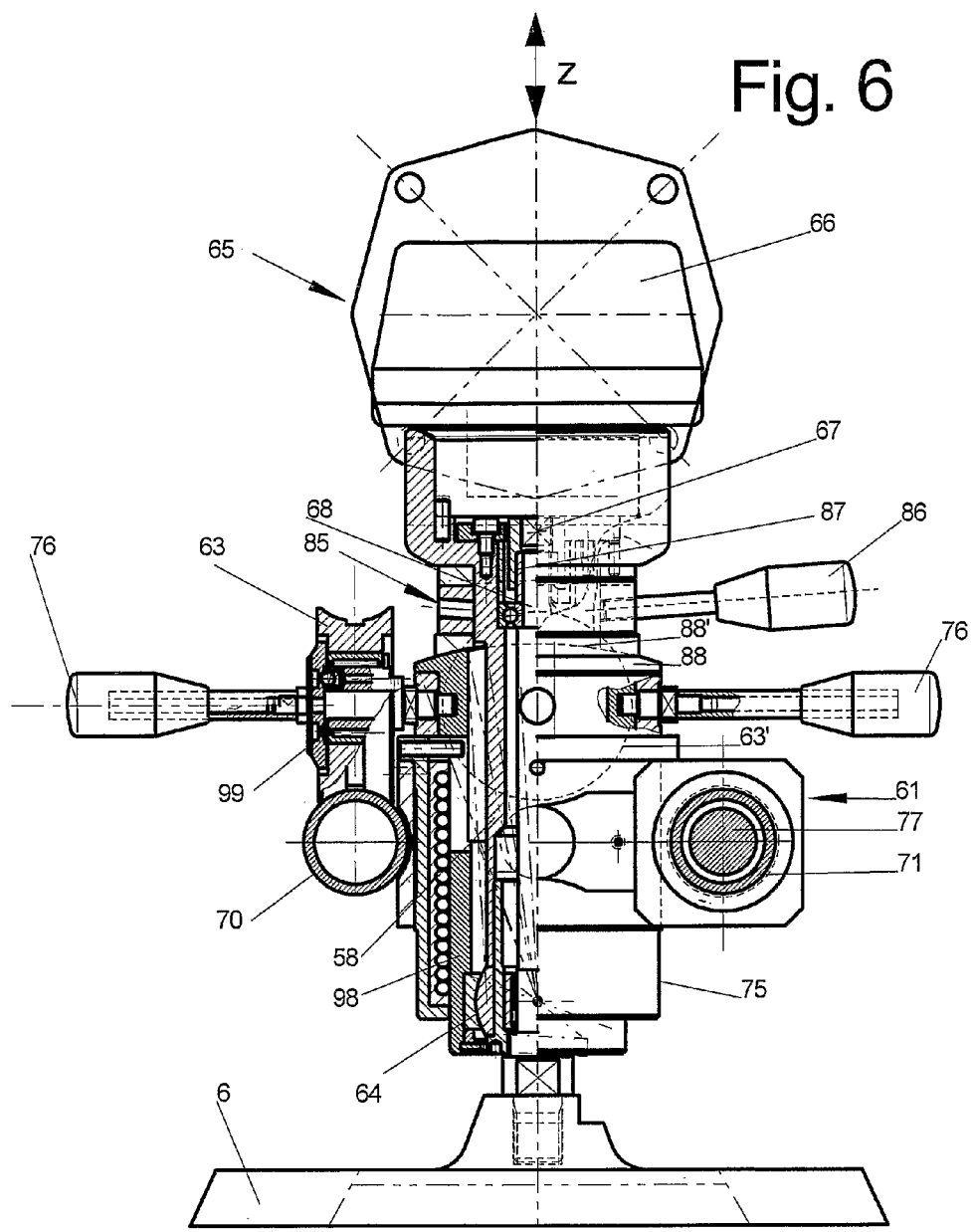

DEVICE FOR POLISHING HARD SURFACES, ESPECIALLY GLASS SURFACES

The invention relates to a device for polishing hard surfaces, especially glass surfaces, according to the preamble of claim 1.

Damaged surfaces, for example scratched glass surfaces or surfaces with etchings, chalk areas, cement areas etc. can, as known in the art, be repaired using a polishing device. The repair is done in several stages (grinding, smoothing, polishing, high polishing), for which replaceable polishing discs are used. The polishing device is guided by hand, which is strenuous, especially where large areas are involved.

The present invention is based on the problem of creating a device of the aforementioned type which simplifies repairs of damaged surfaces and enables extremely precise working, even when used on large areas, on both sides of single-layer or multi-layer glass in installed condition, in almost any application and use.

This problem is solved according to the invention by a device with the features of claim 1.

Further preferred embodiments of the inventive device form the subject matter of the dependent claims.

The inventive device enables simple and precise repair of hard surfaces such as ceramic, marble, granite and in particular areas of glass in practically all qualities of manufacture and finishing, Plexiglas and plastic glass, with precision being guaranteed, even with large surfaces (windows, facades, shop windows, panels, walls, floors, ceilings, conservatories, etc.). The mobility of the device on site is especially advantageous. It is, however, also highly advantageous for stationary use.

Figure 1:
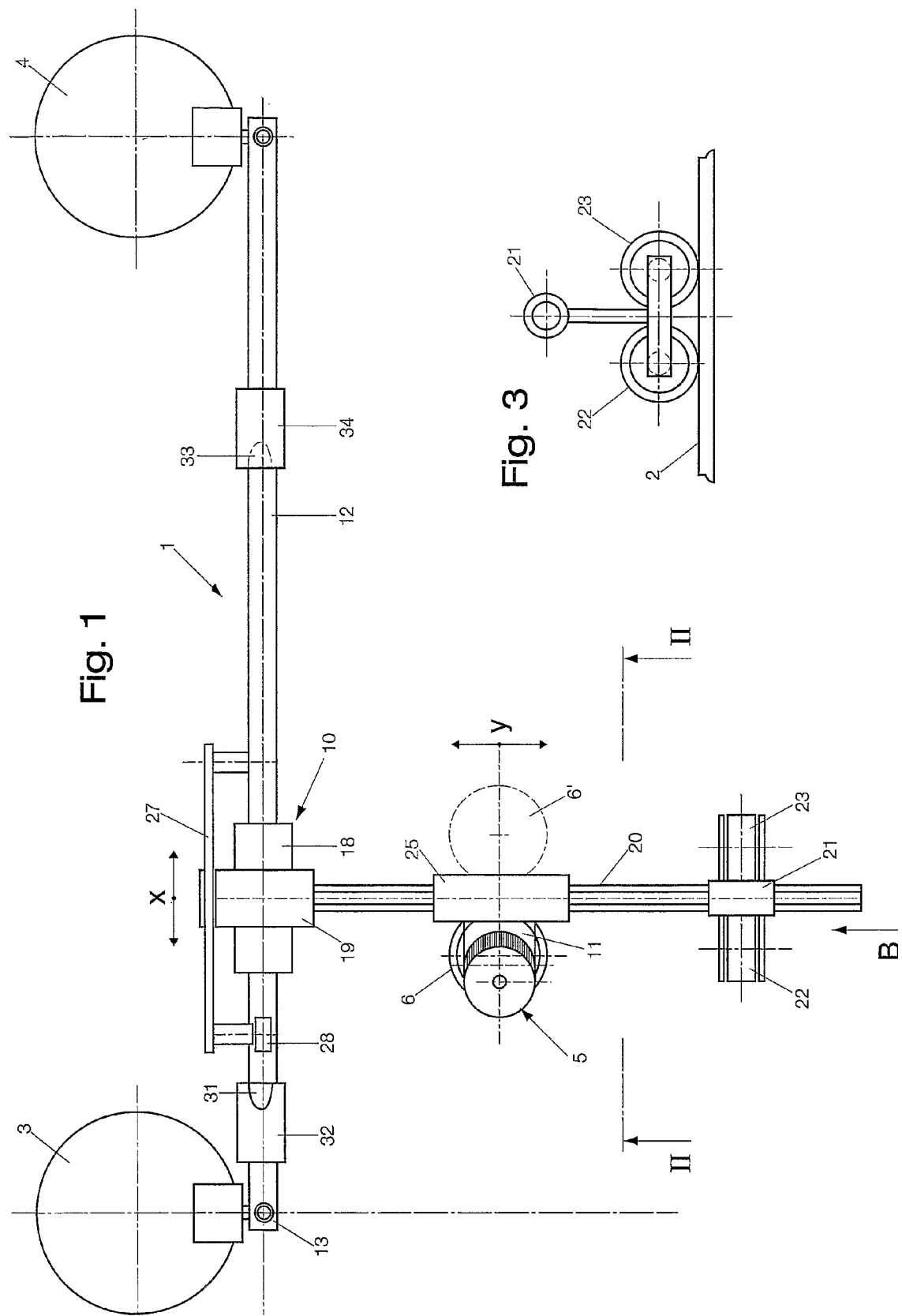
Figure 2:
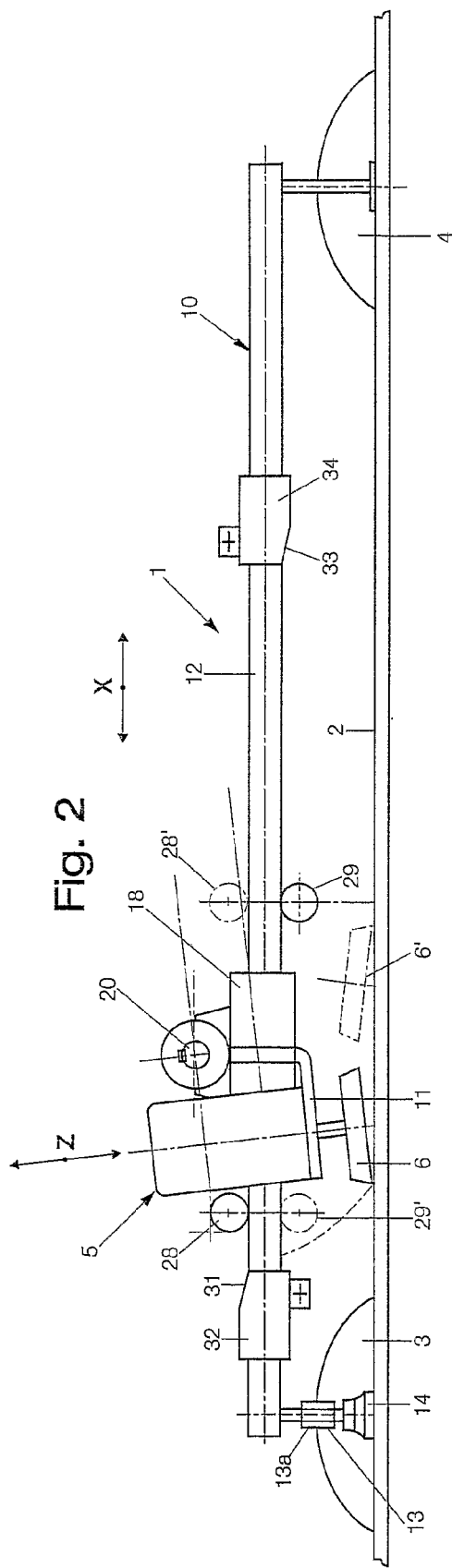
Figure 5:
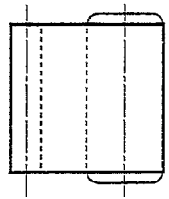
Figure 4:
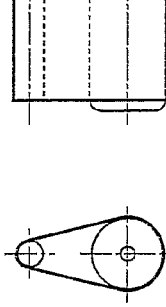
Figure 7:
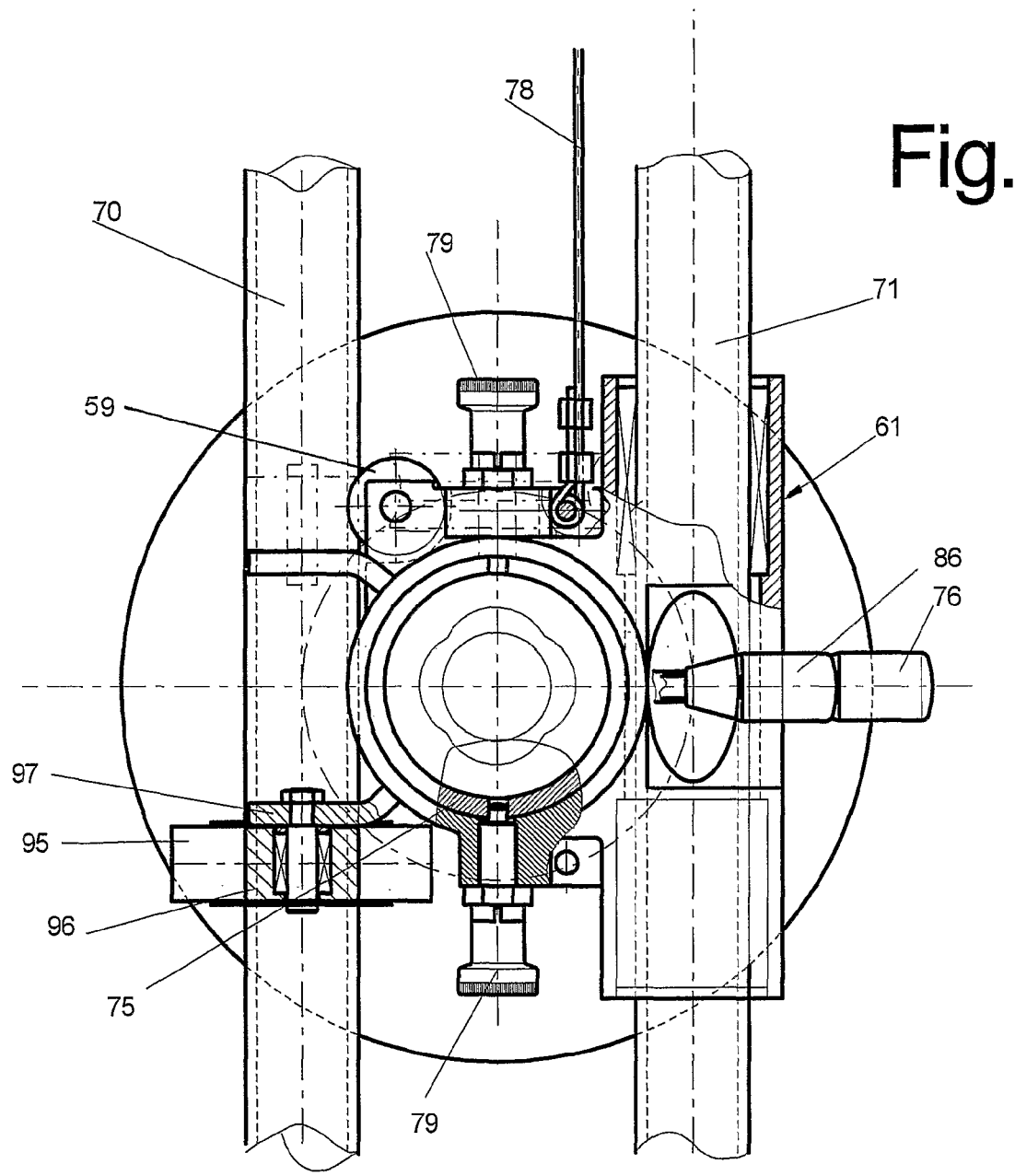
Figure 8:
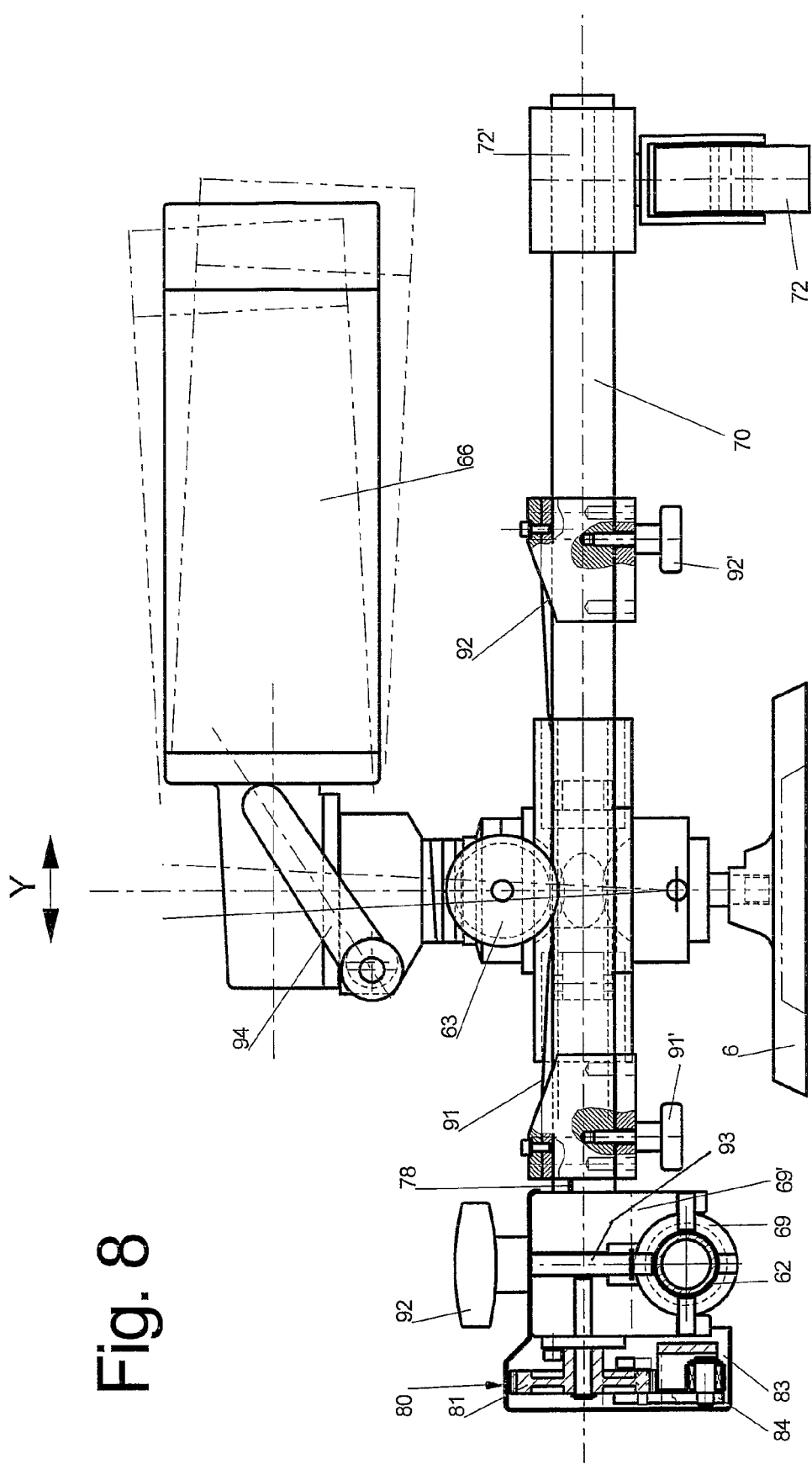
Figure 9:
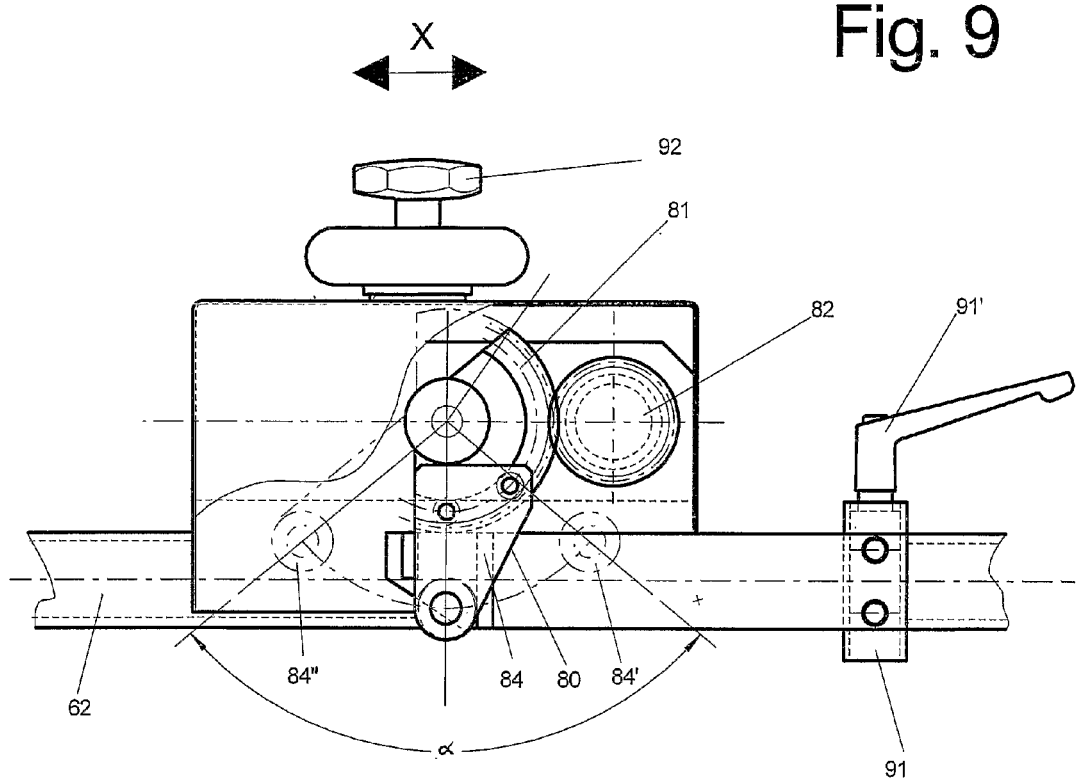

The invention will next be explained in more detail with the aid of the drawings, which show:

FIG. 1 an embodiment of an inventive device for polishing hard surfaces, in particular areas of glass, in top view;

FIG. 2 a section along line II-II in FIG. 1;

FIG. 3 part of the device in the direction of arrow B in FIG. 1,

FIG. 4 diagrammatic lateral view of a polishing belt in place of the polishing disc according to FIG. 2;

FIG. 5 a diagrammatic frontal view of the polishing belt according to FIG. 4;

FIG. 6 a longitudinal section of a variant of an inventive device;

FIG. 7 a top view of the device according to FIG. 6, in which, however, the motor has been left out;

FIG. 8 the device according to FIG. 6 in a lateral view;

FIG. 9 a section through the rocking device of the device; and

Figure 10:
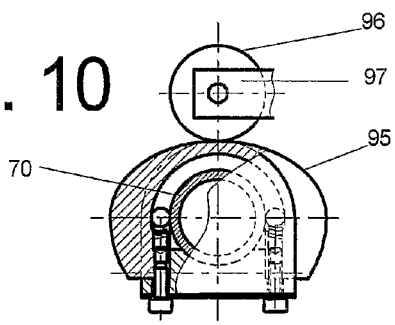

FIG. 10 an eccentric and a wheel of the device co-operating with this.

In FIGS. 1 and 2, a device 1 for polishing hard surfaces, in particular areas of glass, is shown. The processing surface 2 (FIG. 2), for example a shop window pane, a window pane of a house, a glass door or a partition wall or similar. The device 1 can be positioned on a workbench or else—as shown in the drawing—directly on the processing area 2. By the use of suction knobs 3, 4, the device 1 can be attached both to horizontal areas and areas 2 of different orientation, for example to vertical window panes, directly or in the immediate vicinity.

The device 1 includes a polishing device 5 rotationally connected to a drive motor 5' with replaceable polishing discs 6, which according to the invention is moveable in two dimensions, not by hand but with the aid of a displacement device, the displacement device 10 having a holding element 11 for the polishing device 5 and also guiding elements, described below, for the displacement of the holding element 11 in XY-directions.

The guiding elements for the displacement of the holding element 11 include a guide shaft 12, which can be brought into a position exactly parallel to the processing area 2 via a jackscrew 13 provided on at least one end. The jackscrew 13 is assigned a suction knob 14 in turn. The nut part 13a is connected with the suction knob 3 or another means of place holding to fix the device 1. The other end of the guide shaft 12 is shown in simplified form, but could equally be supported by the same parts 13, 13a, 14 on the processing area 2.

Alternative holding elements, which, instead of a screw levelling mechanism, contain an adjustable pivot—or spindle mechanism, are also possible.

A guide bush 18, on which a holding element 19 for a guide rod 20 oriented at right angles to the guide shaft 12 is attached, is arranged so as to move longitudinally on the guide shaft 12 (X axis). On the guide rod 20, a roller holder 21, seen in FIGS. 1 and 3, is arranged so as to move in the longitudinal axis Y of the guide rod 20, which is fitted with two rollers 22, 23 to support the guide rod 20 on the processing area 2. The axes of the rollers 22, 23 are aligned parallel to the longitudinal axis Y of the guide rod 20. It would also certainly be possible for support to be provided via a single roller or a similar parallel mechanism. The variant shown is, however, especially advantageous with respect to stable and gentle support. The adjustment of the roller holder position on the guide rod depends on the size of the processing area and is fixed in a way not shown in more detail (e.g. by means of set collars or position holder).

A guide element 25 is moveably arranged in the area between the roller holder 21 and the holding element 19 on the guide rod 20 in the longitudinal axis Y of the guide rod 20, said guide element being connected with the aforementioned holding element 11 for the polishing device 5. The guide element 25 is in turn fixable in a specified Y-position by means of at least one set ring or setting mechanism, not shown in more detail, for example with a servomotor and spindle, in which case the polishing device 5, by manually moving the entire guide rod 20 together with the guide bush 18 guided along the guide shaft 12, a mechanical drive also being possible, is moved in direction X. A rocker 27 (FIG. 1) is non-rotatably arranged on the guide rod 20, which is pivotably held in the holding element 19 linked with the guide bush 18, said rocker carrying two rollers 28, 29 arranged in the X-direction on both sides of the guide rod 20, one of which is supported on an upper and the other on a lower side of the guide shaft 12 (cf. in particular FIG. 2), so that the guide rod 20 and with it the holding element 11 are held in a specified rotational position shown in FIG. 2 and guided in the X-direction, in which the polishing disc 6 is engaged with the area 2. The polishing disc 6 is now held at a (least possible) setting angle to the surface 2, as shown somewhat exaggeratedly in the drawing.

The sizes (diameters) of the polishing discs 6 are variable and are defined by the size and properties of the surface to be processed.

To restrict the X-motion and/or the polishing length in direction X, two stop sleeves 32, 34 are arranged on the guide shaft 12 and fixed in a specified position, each sleeve being provided with a slanted stop face 31 and 33 respectively for the corresponding rocker-roller 28 and 29 respectively. In principle, these stop faces could also have an interchangeable curving forms, which have been determined according to the laws of light refraction, in order to effect control of the pivoting away of the polishing device.

If the holding element 11 is moved to the left with the polishing device 5 in accordance with FIGS. 1 and 2, at the end of this movement the upper roller 28 runs into the upper stop face 31 of the stop sleeve 32, which causes the guide rod 20 with the holding element 11 to pivot into the holding element 19 and the polishing device 5, controlled accordingly, is raised from the surface 2. The same occurs when the holding element 11 is moved to the right with the polishing device 5 in accordance with FIGS. 1 and 2, the lower roller 29 running into the lower stop face 33 of the stop sleeve 34.

A step-wise displacement of the holding element 11 in the Y-direction occurs between the individual movements in X-direction.

The movements of the polishing device in X- and Y-direction can be conducted discontinuously and alternatively. This enables a polishing pattern to be achieved which is perfectly matched to the surface.

The repair of a damaged surface, for example a scratched glass area, usually occurs in several stages (e.g. polishing away scratches, fine grinding, polishing, high polishing), for which various polishing discs are used. To change the polishing discs 6, the guide rod 20 connected with the guide bush 18 can be pivoted about the longitudinal axis of the guide shaft 12 and the polishing device 5 lifted away from the surface 2.

The two-dimensional XY-movement of the polishing device holding element 11 along the guiding elements 12, 18 and 20, 25 respectively of the displacement device 10 can be effected manually or also e.g. controlled using feed motors (not shown in the drawings).

The inventive device 1 enables simple and precise repair of hard surfaces such as ceramic, marble, granite and in particular areas of glass, where precision is guaranteed even on large surfaces (windows, facades, shop windows, etc.) (the guide shaft 12 can be approx. 3 m long and preferably of telescopic design). The mobility of the device on site is especially advantageous. The device 1 can quickly be attached to the surface processing area (via suction knobs 3, 4, which are advantageously situated outside the processing area), and the desired range of the XY-movements can be determined by adjusting the guide shaft 12 and the stop sleeves 32, 33 respectively and by positioning the roller carrier 21 on the guide rod 20. The guide rod 20 can also be telescopic in design.

FIG. 1 and FIG. 2 also show a position 6' of the polishing disc in a dash-dotted line. This means that the polishing disc can also be arranged on the opposite side of the guide rod 20, which may be necessary, depending on how close the scratches are to the window frame. In that case, however, the rollers would also have to be brought into the appropriate position 28', 29' and the holding element 11, which is not shown in more detail, aligned accordingly.

Instead of polishing devices with polishing discs, in principle it would also be possible to use those with polishing drums with endless polishing belts 40, as shown in diagram form in FIG. 4 and FIG. 5. This polishing belt 40, tensioned about rollers 41, 42, would then be moved with the device in accordance with FIG. 1 and FIG. 2, in similar fashion to the polishing disc, along the processing area and lifted off accordingly at the end.

The entire polishing device can, within the scope of the invention, also be arranged on the opposite side of the guide shaft 10 together with the guide element 20 holding it. The device can also be used in any position through 360°.

FIG. 6 to FIG. 8 show another variant of a device with a polishing device 65 guided on a displacement device, where a motor 66 can be attached to the latter, said motor having a squared motor shaft 61, which is rotatably connectable with a drive shaft 68 coupled with the polishing disc 6 at the other end.

The polishing device 65 is again moveable in X- and Y-direction, for which a guide shaft 62 is provided for the X-direction and, unlike the variant according to FIG. 1, two guide rods 70, 71 running parallel to each other are provided for the Y-direction. The polishing device 65 is arranged so as to project between these two guide rods 70, 71 and is, firstly, mounted so as to move longitudinally via a holding element 61 on the guide rod 71 and secondly, guided via a running wheel 63 on the guide rod 70.

The guide rods 70, 71 are, according to FIG. 8, held by one end on a support 69'. The guide shaft 62 is mounted in a guide bush 69 in the support 69', the guide shaft being arranged at a right angle to these guide rods. At the other end, these guide rods 70, 71 are supportable via at least one roller 72 with a roller holding element 72' on the processing area. As an alternative to this roller holding element 72', a similar bearing may be attached via a support, similarly to the support 69'.

The polishing disc 6 is pivot-mounted, together with the drive shaft 68 mounted in a continuous sleeve 58, and the motor 66 mounted thereon by a pivoting bearing 64 arranged above the polishing disc 6 in a cylinder housing 75 with the holding element 61, so that, depending on the direction of feed, it can be inclined by a few degrees of angle from the vertical position, and in this way it is preferably pivotable in X- or Y-direction, so that the direction of feed can occur in both directions, while the device according to FIG. 1 only allows a feed direction in X-direction, since a pivoting of the polishing disc 6 is only provided for in one plane in this direction. This means that advantageously processing of the areas to be polished can be carried out in both X- and in Y-direction, which produces a better polishing pattern.

The polishing disc 6, with motor 66 and pivotable drive shaft 68 including the pivoting bearing 64, can be moved in the holding element 61 in a Z-direction. To this end, a guide bush 98 coupled with an axle 99 of the running wheel 63 which is movable longitudinally is arranged in the guide housing 75. The pivoting bearing 64 is fixed to the inside of the lower end of the guide bush 98. The result of this is that each direction of movement X, Y and Z of the polishing disc, in addition to the freely selected oscillating-pivoting movement, can be individually and separately set, controlled and simultaneously actuated.

To pivot the polishing disc 6 in the direction of the guide rod 70, 71, the polishing disc 6, together with its drive shaft 68 and also the motor 66, is pivoted in a plane running parallel to the guide rods 70, 71, i.e. perpendicular to the image plane according to FIG. 6. The drive shaft 68 can be fixed again by means of a screw clamping device 85, by rotating a nut sleeve 87 connected to a handle lever 86 at the motor end and screwing it to a sleeve 88 with a convex surface 88' held in the cylinder housing 75.

The running wheel 63 supporting the polishing device 65 sometimes serves to lift the polishing disc 6 from the surface to be processed, as can be seen in FIG. 6 and FIG. 8. Corresponding ramps 91, 92 displaceable on the guide rod 70 are locked into place at a desired position by a fastening lever 91'. If the polishing device 65 is now moved by hand using its handles, for example towards the ramp 91, the polishing device 65 and with it the polishing disc 6 will be lifted off in Z-direction when the running wheel 63 runs into the guide bush 98. This running wheel 63 is displaceably arranged on the cylinder housing 75 in such a way that it can be fixed at least in a position offset by 90°, as shown in FIG. 6 with the running wheel 63' shown in a dash-dotted line.

There is also provided a support 77 according to FIG. 6 integrated in the guide rod 71. This is connected with a cable pull 78 (FIG. 8) fastened to the polishing device 65, while this cable pull 78 is guided to the upper end of the guide rod 71 and around a deflection wheel, not shown in more detail, back to the polishing device 65. This support 77 is advantageously in the form of a gas pressure spring with a cable pull. It could, however, also be provided in the form of a tension—and pressure spring.

FIG. 7 shows fastening studs 79 on both sides of the cylinder housing 75. These can be actuated from the outside, enabling detachable securing of the guide bush 98 and hence the drive shaft 68 in the cylinder housing 75, i.e. the drive shaft can be taken out with the motor after the polishing disc has been uninstalled.

According to FIG. 8 to FIG. 10, a rocking device 80 in a case 83 for raising and lowering the polishing disc 6 over the processing area is provided on the back of the support 69', when the feed movement of this polishing disc along the guide shaft 62 occurs in X-direction. This rocking device 80 has a rocker 84, which can be tilted about a specified angle α to one side or the other. This rocker 84 is rotatably connected with a toothed segment 81, which is in turn engaged with a toothed wheel 82 fixed coaxially on the guide rod 70. When the support 69' is displaced to a limit stop 91, 92 locked onto the guide shaft 62 by means of screws 91', 92', the rocker 84 is pivoted from one angled position 84', 84" to the other and with it the toothed segment 81, the toothed wheel 82 and the guide shaft 70 are thereby rotated. The guide shaft 70 in turn rotates according to FIG. 7 and FIG. 10 respectively on its mounted eccentric 95, which displaces a wheel 96 running on the perimeter of the eccentric 95 and with it the drive shaft 68 and hence the polishing disc 6 in Z-direction, due to the fact that this wheel 96 is mounted on an arm 97 fastened to the cylinder housing 75. In FIG. 7, the running wheel is arranged offset by 90° or 180°, but this is not shown. This guarantees the raising and lowering of the polishing disc 6 as the polishing device 65 is moved back and forth in X-direction. There is also a rotatably mounted guide wheel 59 provided on the holding element 61, which engages in a longitudinal groove of the guide rod 70.

In the initial, vertical downwards, position of the rocker 84 shown, it is possible to work in the other direction (Y).

The guide shaft 62 can be secured by suction knobs 3, 4—as shown in FIG. 1—to the pane to be processed, in which case these suction knobs, depending on the application, can both be mounted externally on the guide shaft 62 or one externally and the other approximately in the middle and the guide bush is mounted on the other side of this guide shaft, so that the guide bush can be displaced approximately as far as the end of this guide shaft. These suction knobs 3,4, provided in the form of so-called suction cup blocks, which can be secured universally in any position relative to the device, are dimensioned such that they guarantee adequate fastening power of the device, even when polishing on a window pane or similar.

A hand wheel 92 is connected with a pin 93 arranged coaxially in the support 69', by means of which this support 69' can be fixed onto the guide shaft, so that when working in the Y-direction, no movement occurs in the X-direction. Furthermore, a clamping lever 94 is also indicated for the fastening of the motor 66. As a further advantage, this means that, according to the application, a motor with different size and output can be fastened. The selection of the size of the motor is dictated by the quality of the glass, the dimensions of the processing area and the diameter of the polishing disc 6 used.

The distance between the processing area and the guide shafts is variable such that the suction cups can be fixed to another plane than the working plane, such as for example in the case of sliding doors, bridging of shop window frames, bridging the coachwork on railway carriages, etc.

It goes without saying that not only planar areas can be polished, such as for example those on modern trains or trams. In these cases, the device could also be stationed on a storage place of such a train and be positioned on the window to be processed by a pivoting movement or similar. Due to the pivotable arrangement of the polishing disc, this could rise or fall during the feed movement according to the shape of the pane.

The device could also be operated automatically or semi-automatically by appropriate devices. This would require the provision of, for example, appropriate rotary spindles and controlled drive motors to feed the polishing discs, as already mentioned.

The invention claimed is:

1. Device for polishing hard surfaces, comprising:
   a motor-driven polishing device; and
   a displacement device that moves said polishing device, said displacement device comprising:
   a guide shaft;
   a guide rod oriented at a right angle to said guide shaft;
   a guide bush movable longitudinally along said guide shaft, said guide rod being coupled to said guide bush at one end region such that said guide rod is movable relative to said guide shaft as said guide bush moves along said guide shaft; and
   movement guiding means for holding said polishing device and enabling and guiding movement of said polishing device longitudinally along said guide rod such that said polishing device is movable in an X direction along said guide shaft and in a Y direction along said guide rod, and
   wherein said guide rod is supported at one end region on said guide shaft and at an opposite end region by a roller assembly.

2. Device according to claim 1, wherein said guide rod consists of a single guide rod, said guide rod being connected at one end with said guide bush arranged so as to be longitudinally displaceable on said guide shaft and being supportable via said roller assembly.

3. Device according to claim 2, further comprising suction cups for fastening said guide shaft to a processing area and at least one jackscrew that brings said guide shaft into position in parallel with the processing area.

4. Device according to claim 2, further comprising replaceable polishing discs arranged on said polishing device, and wherein said guide rod pivots about an axis of said guide shaft to enable changing the polishing discs.

5. Device according to claim 2, wherein said roller assembly comprises
   a roller holder which is displaceable in the longitudinal direction (Y) of said guide rod and is arranged on said guide rod; and
   two rollers arranged on said roller holder to support said guide rod on the processing area, the axes of aligned parallel to the longitudinal direction (Y) of said guide rod.

6. Device according to claim 2, wherein said guide rod is pivotably held in an additional holding element fixed to said guide bush and non-rotatably connected to a rocker, said rocker carrying said roller assembly, said roller assembly comprising two rollers arranged on both sides of said guide rod, one of which abuts on an upper and the other on a lower side of said guide shaft and thus holds said guide rod and thus also said holding element in a specified rotary position, in which a polishing disc on said polishing device engages with the processing area, while two stop sleeves can be fixed to said guide shaft, each sleeve being provided with a slanted stop face for the corresponding rocker-roller, via which the rocker and thus also said guide rod are pivotable and the polishing disc can be disengaged from the processing area.

7. Device according to claim 1, wherein said movement guiding means comprise a holding element that holds said polishing device and two-dimensional movement of said holding element in the X-direction and in the Y-direction is effected manually.

8. Device according to claim 1, further comprising an additional guide rod oriented at a right angle to said guide shaft, said guide rods running parallel to each other.

9. Device according to claim 8, wherein said movement guiding means comprise a holding element and a running wheel, said polishing device being mounted so as to move longitudinally via said holding element on a first one of said guide rods and to be guided via said running wheel on a second one of said guide rods.

10. Device according to claim 8, further comprising a drive shaft and a motor mounted on said polishing device by a pivoting bearing arranged above a polishing disc arranged on said polishing device, said polishing disc being pivot-mounted in a cylinder housing so that, depending on the direction of feed, it can be inclined by a few degrees of angle from the vertical position, and preferably pivotable in X- or Y-direction, so that the direction of feed can occur in both directions.

11. Device according to claim 8, further comprising a support integrated in said guide rod, a cable pull fixed to said polishing device and connected to said support, said cable pull being guided to an upper end of said guide rod and around a deflection wheel or similar back to said polishing device.

12. Device according to claim 11, wherein said support takes the form of a gas pressure spring with a cable pull or a tension/pressure spring.

13. Device according to claim 1, wherein said movement guiding means comprise a holding element that holds said polishing device and two-dimensional movement of said holding element in the X-direction and in the Y-direction is controlled using motors.

14. Device according to claim 8, wherein said polishing device is arranged to project between said guide rods.

15. Device for polishing hard surfaces, comprising:
a motor-driven polishing device; and
a displacement device that moves said polishing device, said displacement device comprising:
   a guide shaft;
   a guide rod oriented at a right angle to said guide shaft;
   a guide bush movable longitudinally along said guide shaft, said guide rod being coupled to said guide bush at one end region such that said guide rod is movable relative to said guide shaft as said guide bush moves along said guide shaft; and
   movement guiding means for holding said polishing device and enabling and guiding movement of said polishing device longitudinally along said guide rod such that said polishing device is movable in an X direction along said guide shaft and in a Y direction along said guide rod,
   a support that holds a first end of said guide rod, said guide bush being situated in said support, said guide shaft being mounted in said guide bush, and
   at least one roller assembly that supports a second end of said guide rod.

16. Device according to claim 1, wherein said polishing device is configured to polish glass surfaces and said polishing device is arranged relative to a polishing area such that said guide shaft is parallel to the processing area.

17. Device according to claim 1, further comprising replaceable polishing discs or polishing drums with polishing belts arranged on said polishing device.

18. Device according to claim 1, wherein said movement guiding means comprise a holding element arranged to enable said polishing device to be movable in a Z direction.

* * * * *